Figure 1:
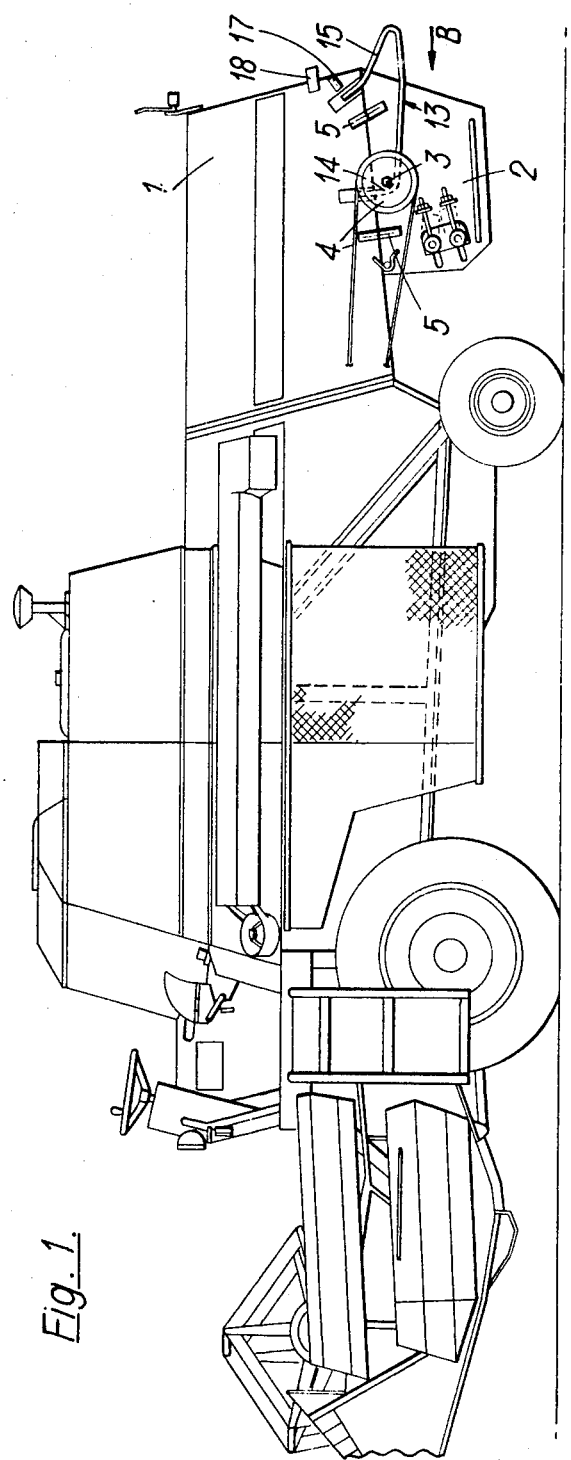

United States Patent
Wenzel et al.

[15] 3,690,359
[45] Sept. 12, 1972

[54] APPARATUS FOR MOUNTING AN ACCESSORY ON A COMBINE

[72] Inventors: Alfred Johannes Wenzel, Obering; Alwin Hantel, Schlehenweig, both of Germany

[73] Assignee: Massey-Ferguson G.m.b.H., Staendeplatz, Germany

[22] Filed: March 11, 1971

[21] Appl. No.: 123,206

[52] U.S. Cl..................146/123, 146/DIG. 4, 130/26, 56/DIG. 9
[51] Int. Cl............................................A01f 12/40
[58] Field of Search............146/DIG. 4, 123; 130/26; 56/DIG. 9

[56] References Cited

UNITED STATES PATENTS 2,862,536    12/1958    Grönberg..............146/DIG. 4

*Primary Examiner*—Willie G. Abercrombie
*Attorney*—Gerhardt, Greenlee & Farris

[57] ABSTRACT

Apparatus for mounting an accessory, for example a straw chopper, on a combine harvester so that the accessory can be moved manually by a single operator from an "in-use" position to an unobtrusive "out-of-use" position. The accessory is carried on rails mounted on opposite sides of the combine and having upturned ends. A pair of aligned support members are provided on opposite sides of the accessory and adjacent its center of gravity for engagement with the rails. The accessory is moved from its in-use position to its out-of-use position by sliding or rolling it along the rails and then pivoting it about the support members.

10 Claims, 7 Drawing Figures

Inventors
ALFRED JOHANNES WENZEL
BY ALWIN HANTEL
Gerhardt, Greenlee & Farris
Attorneys

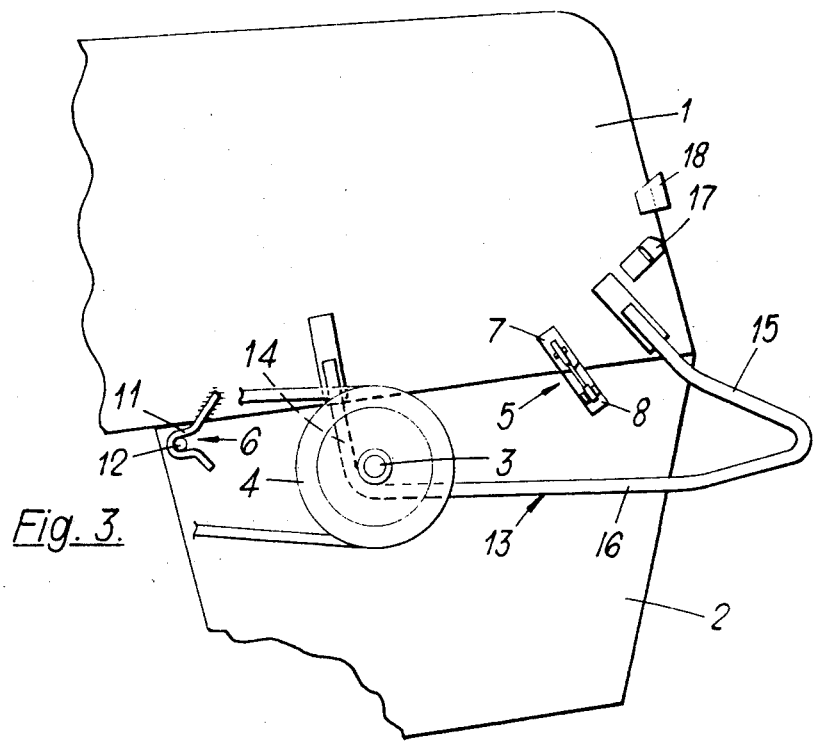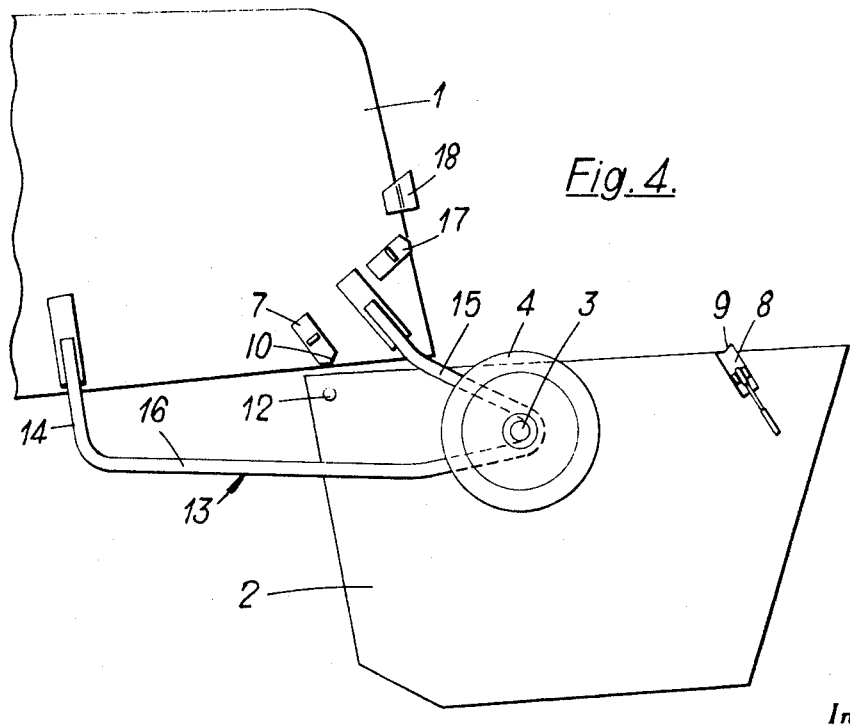

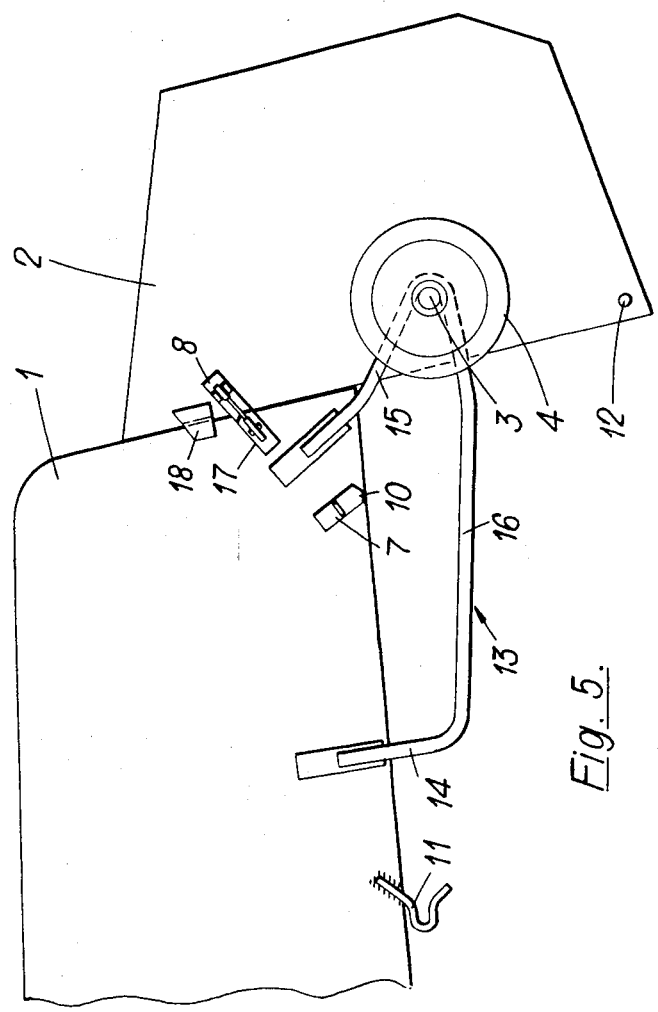

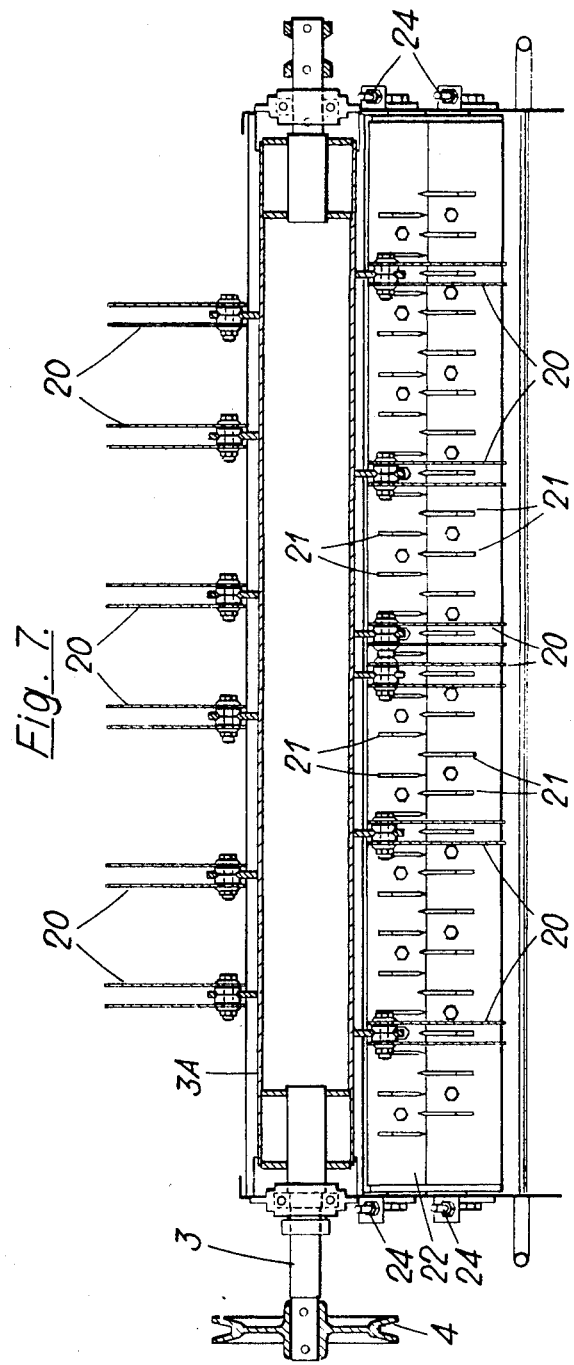

APPARATUS FOR MOUNTING AN ACCESSORY ON A COMBINE

This invention relates to combine harvesters (hereinafter referred to as "combines") and more particularly to apparatus for mounting accessories thereon.

In combines in use at present it is often necessary to provide relatively bulky accessories such as straw choppers or straw presses which the combine operator may not wish to use at all times but which must be readily available for use when required. The accessories are generally mounted on the combine in an "out-of-use" position and are moved manually, when desired, to an "in-use" position. Due to the bulky nature of most accessories such an operation is tiring and time consuming.

An object of the present invention is to provide apparatus for mounting accessories on a combine so that they may be conveniently and easily moved from their "in-use" position to their "out-of-use" position and vice versa.

According to the present invention there is provided apparatus for mounting an accessory on a combine so that said accessory may be moved from an "in-use" position to an "out-of-use" position remote from and inclined to said "in-use" position, comprising releasable fastening means on the combine and on the accessory, one or more guide members provided on said accessory adjacent the center of gravity thereof and each co-operable with a guide rail on the combine, and in which said rail includes a portion extending substantially horizontally, and first and second stops co-operable with said guide members and located respectively adjacent said "in-use" position and said "out-of-use" position so that, in use an accessory is moved from its "in-use" position to its "out-of-use" position by releasing said fastening means, allowing said guide members to pass along the horizontal portion of said rail to said second stop, pivoting the accessory about said guide member into the "out-of-use" position and securing the fastening means.

Preferably, said guide members are in the form of projecting pins, and said guide rail is in the form of a tube upwardly bent at each end to form said stops. The guide rail may be bent further so that the accessory moves away from the combine as it is moved towards the "out-of-use" position and the fastening means may include self-centering toggle action clips and co-operating projection and recess means on the accessory and on the combine.

Preferably also, said accessory is a straw chopper comprising a housing which has a chopper blade shaft journalled therein.

Further according to the present invention there is provided a combine including apparatus for mounting accessories thereon as set out in the three last preceding paragraphs.

Figure 2:
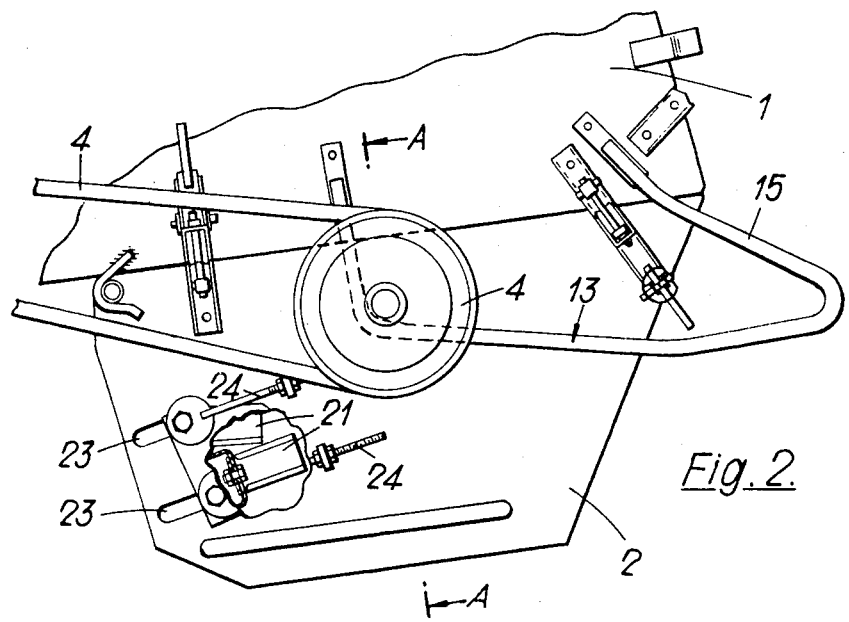
Figure 6:
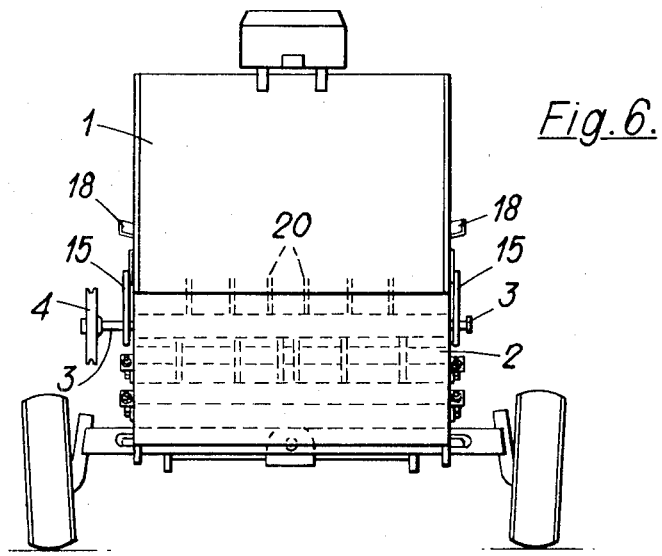

An embodiment of the invention will now be described, by way of example, with reference to the accompanying drawings, in which:

FIG. 1 is a side view of a combine with an accessory mounted thereon, and showing the accessory in its "in-use" position, FIG. 2 is a side view of a detail of FIG. 1, FIG. 3 is a diagrammatic view corresponding to FIG. 2 of a modified arrangement, FIG. 4 is a view corresponding to FIG. 3 and showing the accessory in a position during movement from its "in-use" position to its "out-of-use" position, FIG. 5 is a view corresponding to FIGS. 1 and 2, and showing the accessory in its "out-of-use" position, FIG. 6 is a view in the direction of arrow 'B' of the combine shown in FIG. 1, and FIG. 7 is a sectional view on the line A—A of FIG. 2.

Referring to the drawings, a combine includes a hood 1; an accessory, in this case a straw chopper 2, is mounted on the hood 1 so as to be moveable between an "in-use" position (as shown in FIGS. 1, 2 and 3) and an "out-of-use" position (as shown in FIG. 5). The chopper 2 includes a rotary shaft 3 driven through a V-belt and pulley 4 by the combine, and carrying on a tubular portion 3A thereof (FIG. 7) pivoted blades 20 which are co-operable with fixed knives 21 adjustably mounted through transverse cutter bars 22 on the housing of the chopper. The cutter bars 22 are mounted on the housing through slots 23 along which they are adjustable by means of draw bolts 24.

For convenience the blades of the knives 20 and 21 are each provided with two cutting edges so that when one cutting edge becomes worn the blade may be rotated through 180° and the other cutting edge brought into operation.

The chopper 2 is secured to the hood 1 in its "in-use" position by means of over-center or toggle-action clips 5, two (FIGS. 1 and 2) or one (FIGS. 3 to 5) on each side of the chopper 2, and projection and recess means 6. The toggle-action clips 5 are self-centering and comprise a male portion 7 and a female portion 8. In this case the male portion 7 is mounted on the hood 1 and the female portion 8 is mounted on the chopper 2. The female portion 8 has a notched end 9 into which a complementary shaped end 10 of the male portion 7 fits so as to align the clip 5 before fastening. The remaining parts of the clips are conventional.

The projection and recess means 6 comprises a pair of substantially U-shaped rods 11 forming recesses or sockets and having one end connected to the hood 1 and both ends flared to facilitate entry therein of projecting pins 12 on the chopper 2. The projection and recess means 6 is located adjacent the front of the chopper 2 and is adapted to retain that part of the chopper 2 in its "in-use" position.

A guide rail 13 is provided on each side of the hood 1 and comprises a tube upturned at its ends 14 and 15 and connected by the latter to the hood 1 so as to provide a substantially horizontally extending portion 16 and a slightly upwardly inclined portion 16A slung below the hood 1. Guide members are formed on the chopper 2 by projecting ends of the chopper shaft 3 and are located adjacent the center of gravity of the chopper. The guide members may alternatively be formed as separate projections on the chopper 2.

The fastening means also includes further male portions 17 for co-operation with the female portions 8 of the over-center clips 5 when the chopper 2 is in its "out-of-use" position. Flared guides 18 are also provided for centering the chopper 2 before fastening in its "out-of-use" position and projections may be provided on the chopper which hook over the guides to further support the chopper in its "out-of-use" position.

In use, the chopper 2 is moved from its "in-use" position to its "out-of-use" position as follows.

The chopper drive is disconnected by removing the belt 4 and the toggle-action clip 5 is released so that the rear end of the chopper 2 drops until the guide members 3 engage the horizontal portion 16 of the guide rail 13. The chopper 2 is now pushed, substantially horizontally and then slightly upwardly, rearwards of the combine until the guide member 3 is stopped by the upturned end 15 (FIG. 4). Such rearward movement of the chopper 2 disconnects the projection and recess means 6.

From the position shown in FIG. 4 the chopper 2 is pivoted, substantially about its center of gravity, into its "out-of-use" position (FIG. 5), being guided into position by the flared guides 18 and by the co-operating ends of the male portion 17 and female portion 8 of the clips 5. When in position the clips 5 are fastened with the result that the chopper 2 is firmly secured in its "out-of-use" position.

Movement from the "out-of-use" position to the "in-use" position is accomplished by reversing the above steps.

It will be noted that the substantially horizontal portions 16 of guide rails 13 diverge from the lower edge of the combine hood 1 to permit the rotary knives 20 to clear the transverse bottom rear edge of the hood as the chopper is moved to its "out-of-use" position. Rollers (not shown), mounted on guide members 3, rotatable with respect thereto, and engageable with the guide rails, may be provided to assist movement of the chopper along the rails and to allow free rotation of the knives 20 about the axis of shaft 3A during such movement. Such free rotation permits the knives easily to move past the transverse rear bottom edge of the hood 1 in a combine in which less clearance between the knives 20 and the hood is provided than in the embodiment described above.

It should also be noted that although portion 16 of guide rail 13 has been described as extending substantially horizontally, in fact it extends downwardly at a very small angle to the horizontal. The slight downward inclination of both portions 16 and 16A of rails 13 promotes easy movement of the chopper away from its two end positions but without materially adding to the effort needed to move it to the said positions.

While a specific form of the invention has been illustrated and described in the foregoing specification and accompanying drawings, it should be understood that the invention is not limited to the exact construction and arrangement shown, but that various alternatives and equivalents in the structure and arrangement of parts will be apparent to those skilled in the art, all of which fall within the scope and spirit of the invention. For example, the portions 16, 16A of guide rail 13 may both be horizontal. Also, the invention is applicable to combine accessories other than straw choppers.

We claim:

1. Apparatus for mounting an accessory on a combine so that said accessory may be moved from an "in-use" position to an "out-of-use" position remote from and inclined to said "in-use" position, comprising releasable fastening means on the combine and on the accessory, at least one guide member provided on said accessory adjacent the center of gravity thereof, a guide rail on the combine, said guide member being co-operable with the guide rail, said rail including a portion extending substantially horizontally, and first and second stops co-operable with said guide member and located respectively adjacent said "in-use" position and said "out-of-use" position so that, in use, an accessory is moved from its "in-use" position to its "out-of-use" position by releasing said fastening means, allowing said guide member to pass along the substantially horizontal portion of said rail to said second stop, pivoting the accessory about said guide member into the "out-of-use" position and securing the fastening means.

2. Apparatus as claimed in claim 1 comprising a pair of guide members each in the form of a projecting pin, said guide rail being in the form of a tube upwardly bent at each end to form said stops.

3. Apparatus as claimed in claim 1 in which said guide rail includes a portion arranged to be mounted so as to be inclined downwardly at a small angle to assist movement of the accessory from its "in-use" position.

4. Apparatus as claimed in claim 1 in which said guide rail includes a portion arranged to be mounted so as to be inclined downwardly at a small angle to assist movement of the accessory from its "out-of-use" position.

5. Apparatus as claimed in claim 1 in which said fastening means includes over-center toggle action clips on the accessory and on the combine.

6. Apparatus as claimed in claim 5, in which said clips are self-centering.

7. Apparatus as claimed in claim 1 in which outwardly flared guides are provided on the combine to guide the accessory into its "out-of-use" position.

8. Apparatus as claimed in claim 1 in which said accessory is a straw chopper comprising a housing which has a chopper blade shaft journalled therein.

9. Apparatus as claimed in claim 8, in which said guide members are located adjacent the center of gravity of the chopper and formed by projecting ends of the chopper blade shaft and a guide rail is provided at each side of the straw chopper.

10. A combine harvester including apparatus as claimed in claim 1.

* * * * *